United States Patent [19]

Schoessow

[11] Patent Number: 4,784,085
[45] Date of Patent: Nov. 15, 1988

[54] SUPPORT STANDARD FOR IMPLEMENT

[76] Inventor: John Schoessow, Rte. 2, Portage, Wis. 53901

[21] Appl. No.: 884,386

[22] Filed: Jul. 11, 1986

[51] Int. Cl.⁴ ............................................. A01K 1/10
[52] U.S. Cl. ..................................... 119/58; 405/249
[58] Field of Search ..................... 119/58, 59, 60, 61; 248/152; 52/169.8, 169.13; 405/249; 114/49

[56] References Cited

U.S. PATENT DOCUMENTS

| | | | |
|---|---|---|---|
| 2,019,831 | 11/1935 | Ricardo | 114/49 X |
| 2,581,098 | 1/1952 | Guenzel | 114/49 X |
| 2,830,558 | 4/1958 | St. Pierre | 119/58 |
| 4,020,794 | 5/1977 | Nethery | 119/58 |

Primary Examiner—Robert P. Swiatek
Attorney, Agent, or Firm—Keith Schoff

[57] ABSTRACT

A supporting standard for stationary farm implements is configured with a horizontally extending trough-like foot of downward-narrowing cross-section to enable the foot to sit lightly on soft earth and be easily extracted from frozen soil.

3 Claims, 1 Drawing Sheet

SUPPORT STANDARD FOR IMPLEMENT

BACKGROUND OF THE INVENTION

1. Field of Art

Agricultural livestock feeding yard soil is constantly being irrigated with animal refuse and kneaded by livestock moving about the yard causing it to have little load bearing strength for as much as a foot below the ground surface. Freezing and accompanying expansion of the soil in cold weather will often cause any stationary farm implement which has sunk into the soil to be firmly stuck until a thaw occurs or until it is chiseled out unless flotation type feet are provided for the implement.

2. Prior Art

An animal feeder is shown in U.S. Pat. No. De. 230,612 having tubular legs configured as flattened loops which rest on the ground surface providing a broad supporting base for the feeder.

SUMMARY OF THE INVENTION

Stationary farm implements, such as livestock bunk feeders, are provided with horizontally extending, trough-like feet having downward-narrowing configuration to enable the implement to exert low bearing pressure on the ground and to facilitate extraction of the implement from frozen soil when the feet are deeply embedded in the earth.

DESCRIPTION OF THE INVENTION

Figure 1:
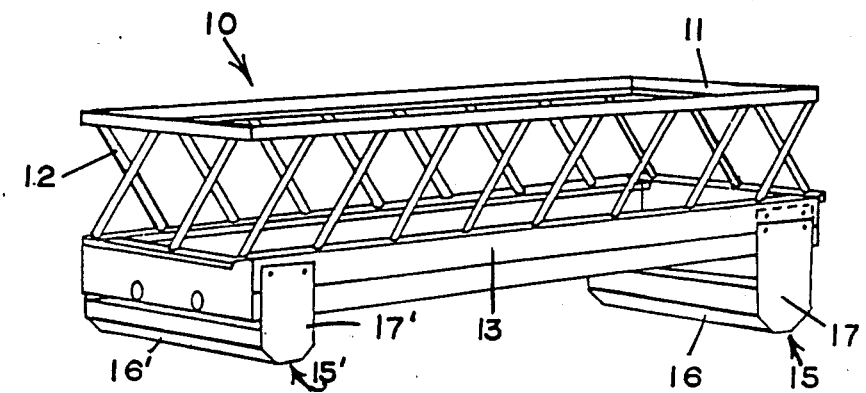
FIG. 1 is a perspective view of a bunk feeder for cattle which is provided with an embodiment of a supporting standard of this invention.

FIG. 1 shows bunk feeder 10 for livestock comprising pan configured manager 13 with top rail 11 extending along all four sides supported by welded stays 12. Stays 12 are shown canted at an angle to vertical for the purpose of discouraging livestock from pulling fodder from the feeder and then moving away in the process of feeding, letting fodder drop to the ground. Alternatively, the stays may be vertically set or may be provided in any arrangement desired. Manger 13 provides the base support for stays 12, and to which they are welded, and is designed for being filled with fodder, hay or other animal feed. The feeder construction above described is conventional and comprises no part of this invention.

Standards 15, 15' support manger 13 of feeder 10, and are of similar construction, with standard 15' being less elevated than standard 15, as shown in FIG. 1; however, end wall 17 of standard 15 may be bolted to manger 13 at different elevations, as shown in broken line representation, to position the manger at optimum height for the size of livestock for which it is to be used. Foot portions 16, 16', respectively, of standards 15, 15' may be fabricated from rectilinearly shaped metal sheet or plate with four next adjacent lowermost corners being angled at forty-five degrees each and the two uppermost corners, at ninety degrees each, all such angles being formed with apexes parallelly extending, and spaced so that a tube of symmetrical, polygonal cross section is formed with lateral extremities welded together, either abutting or overlapping. If preferred, the lowermost four corner angle may total less than 180 degrees and the two topmost corner angle more, in complementary fashion, or a non-symmetrical cross section may be provided with as few as three sides, or with curved sides rather than planar facets. A cross sectional configuration may be provided in which a draft angle from vertical is furnished for all excpet end and top surfaces which facilitates extraction of an implement from frozen ground. Planar end portions 17, 17' are provided on each end face of standards 15, 15' being fastened to portions 16, 16' and to manger 13 of feeder 10. The resulting structure provides flotation quality to standards 15, 15', enabling them to exert relatively low bearing pressure on the surface of the ground and facilitating easy extraction of feeder 10 from frozen or wet soil, simply by application of lifting force. If preferred, separate standards may be provided at each corner of the feeder or at other locations under manger 13 without departing from the inventive concept herein. The configuration of the standards also enables the feeder, or other implement on which the standards are applied, to be conveniently skidded or dragged from one location to another in a feed yard without requiring the implement to be lifted. End walls 17, 17' may angled toward each other with outer faces downwardly converging to further improve the ease with which an implement can be moved or broken from frozen ground, and if individual standards are placed under each corner of manger 13, it may be that the end walls have greater facial area than that of the faces extending transversely of manger 13 and that the latter faces could be simply vertical.

Any suitable material or fabrication procedure may be utilized for providing flotation quality to the feet used for standards on feeder 10 including stamping, forging or casting of metal, or injection or blow molding of polymeric synthetic resin, or forming of resin coated glass fiber fabric into either hollow or foam filled solid configurations. In non-preferred embodiments, the tops of standards 15, 15' may be open rather than closed; however, it is necessary then to prevent the standards from sinking to a depth at which flooding could occur by wet soil over running the top of the feet portions 16, 16'.

An article of this invention requires that opposite walls of a foot be upwardly non-converging and that at least one pair of opposite walls be diverging from the base upward for at least a portion of the height of the walls. The latter configuration enables an implement foot to have lifting force exerted upon it either vertically or at a slight non-vertical angle so that a component of the lifting force acts perpendicularly to the surfaces of upwardly diverging sides causing parting of the outward facing surfaces of those sides from embedding material with lifting of the foot. The longer faces of a foot are preferably upwardly diverging with the shorter faces non-diverging for simplicity of manufacture, although upward divergence between all oppositely facing wall and end surfaces is preferred. Except for the top, and a horizontal bottom surface, no surface should extend upwardly and inwardly.

I claim:

1. A supporting standard for implements, a plurality of which provide flotation characteristics to an implement in water-soaked or otherwise poor load-bearing soils and facilitate removal thereof when embedded in frozen ground, each said standard comprising,
   (a) a foot portion configured with a relatively broad basal face and with at least one pair of oppositely disposed, adjoined side walls upstanding an elevational distance at least as great as said basal face breadth wherein said at least one pair of said side walls comprises angled sections which upwardly diverge from said basal face for at least a portion of the height of said side walls, (b) a pair of oppositely facing end portions transversely extending between end extremities of said side walls and adjoined thereto, (c) means for attaching said foot portion and end portions to the lower extremity of an implement to be supported wherein said means comprise upwardly reaching extensions from at least one pair of said oppositely disposed side walls and said oppositely facing end portions thereby to position an implement to which said supporting standard is attached elevationally higher than said foot portion and provide for sinking of said foot portion in soft soil without embedding an implement so supported therein.

2. The standard of claim 1 comprising additionally a top enclosing said foot portion.

3. The standard of claim 1 wherein said basal face and said at least one pair of side walls comprise a single piece of formed material.

* * * * *